United States Patent [19]
Chiu et al.

[11] Patent Number: 5,798,769
[45] Date of Patent: Aug. 25, 1998

[54] METHOD AND APPARATUS FOR MAINTAINING LINKS BETWEEN GRAPHIC OBJECTS IN A FREE-FORM GRAPHICS DISPLAY SYSTEM

[75] Inventors: Patrick Chiu, Menlo Park; Thomas P. Moran, Palo Alto; William J. vanMelle, Los Altos, all of Calif.

[73] Assignee: Xerox Corporation, Stamford, Conn.

[21] Appl. No.: 698,741

[22] Filed: Aug. 15, 1996

[51] Int. Cl.⁶ .................................................. G06F 15/00
[52] U.S. Cl. .................................................. 345/442
[58] Field of Search .................................. 345/440, 441, 345/442, 443, 117, 118, 121

[56] References Cited

U.S. PATENT DOCUMENTS 5,680,530  10/1997  Selfridge et al. .................... 395/140
5,704,028  12/1997  Schanel et al. ..................... 345/440

*Primary Examiner*—Phu K. Nguyen
*Attorney, Agent, or Firm*—Richard B. Domingo

[57] ABSTRACT

In a computer controlled display system capable of supporting free form graphical input, techniques for maintaining the topology of a node-link structure when nodes are moved. When a node is moved, arbitrarily shaped links to other nodes will automatically be reshaped. The manner in which the link reshapes will depend on where a node is moved relative to the node to which it is linked. Various techniques for reshaping the node in order to retain the node-link structure topology are provided. A link may be reshaped by curve transformation or flipping the link shape about an axis. Curve transformation is a technique wherein the shape characteristics of a link are retained no matter where the node is moved. However, links that intersect, i.e. pass through, the nodes may arise from such reshaping. Various techniques for correcting link intersection situations and include flipping the attachment points of the links on the nodes, truncating and reattaching the link at the point where a link intersects a node or rerouting the link so that intersection is avoided.

16 Claims, 14 Drawing Sheets

METHOD AND APPARATUS FOR MAINTAINING LINKS BETWEEN GRAPHIC OBJECTS IN A FREE-FORM GRAPHICS DISPLAY SYSTEM

CROSS-REFERENCE TO RELATED APPLICATION

This application is related to concurrently filed and pending application entitled "Method and Apparatus For Creating Outlines Of Graphic Objects In A Free-Form Graphics Display System", Ser. No. not yet assigned, which is assigned to the same assignee as the present application.

FIELD OF THE INVENTION

The present invention is related to the field of operating in a graphics based computer system, and in particular to maintaining the topology of a node-link structure as nodes are moved.

BACKGROUND OF THE INVENTION

Computer based systems such as pen based systems and "electronic whiteboards" (e.g. the LiveBoard™ available from LiveWorks a division of Xerox Corporation), provide graphical user interfaces based on utilization of an input device such as a pen, stylus or a cursor control device. In such systems the "display" acts as both a means for showing data and as an input medium. Graphic objects may be "drawn" on the display via pen strokes created using the input device. The graphic objects may represent words, figures or anything that can be displayed. Various operations can then be performed on the graphic objects using an input technique known as gestures. Gestures are themselves merely pen strokes which are interpreted as instructions. Sometimes, such systems will have a draw mode of operation and a gesture mode of operation to distinguish when a pen stroke creates a persistent graphic object or when the pen stroke is treated as a gesture.

When interacting with a computer based system, stopping the thought process in order to wait for operations, e.g. to group or rearrange graphic objects, has a very detrimental effect. Such stoppages generally slow the creative processes. This is of particular impact to the synergy of the group interactions. Artificial delays may cause participants to "lose their train of thought" resulting in the possible loss of ideas. Thus, there is a general need in systems with graphical user interfaces for techniques that provide intuitive and quick manipulation of graphic objects.

One use of systems is the creation and manipulation of node-link diagrams. For example, various project management, flowcharting and drawing programs enable the maintenance of the topology of a node-link structure as the nodes are moved. Known programs typically operate with the nodes and links being of a known pre-declared type. Difficulties however arise when the diagram is free-form, i.e. the nodes and links have arbitrary shapes.

Such manipulation of a free form node-link structure is described in EP 0 667 567 A2 entitled "Apparatus and Method For Supporting the Implicit Structure Of Freeform Lists, Outlines, Text, Tables, and Diagrams In A Gesture-Based Input System and Editing System", which is assigned to the same assignee of the present invention. In EP 0 667 567 A2 diagrams, i.e. node-link structures, are described which have persistent links which maintain shape characteristics as nodes are moved. Links are reshaped using linear geometric transformations that preserve its characteristic shape while "stretching" enables the link to fit the new positions of the nodes it connects. Endpoints of the links may be moved if movement of the node requires it.

SUMMARY

In a computer controlled display system capable of supporting free form graphical input, techniques for maintaining the topology of a node-link structure when nodes are moved are disclosed. A link will be reshaped depending on where a node is moved relative to the node to which it is attached. Both the link and node are of an arbitrary shape. In the simple case, a link will stretch or contract if the link is a straight line and direction of movement is along that line. However, links and the direction of movement of nodes is not limited to straight lines. So various methods for retaining the node-link structure topology when a node is moved are needed. Generally, the link reshaping occurs automatically when a node is moved. The intent with respect to "automatic" link reshaping is to retain the basic shape characteristics of the link and to avoid undesirable artifacts when moving a node (e.g. a link intersecting through a node). Link reshaping is accomplished through a combination of curve transformation, link flipping, link attachment point flipping and link truncation.

Curve transformation of a link is more than a simple scaling. Rather, a link is composed of a plurality of segments, and the displacement from a node move operation is divided up (according to a certain transformation factor based on each segment) and added to the segments. Flipping the link shape retains shape characteristics and is desirable since a node may be moved anywhere on a work surface relative to a stationary node. The points at which links "touch" a node are termed attachment points. The attachment points at which the link is attached to the stationary node is used to define an origin of a local coordinate system for performing the link reshaping. Depending on where the node is moved, the link shape may be flipped about one or both of the axes of the coordinate system and the flipped link image used for reshaping.

Avoiding undesirable artifacts (i.e. a link intersecting a node) is accomplished by flipping the attachment points of the link on the nodes or by rerouting the link. Flipping an attachment point is invoked only if the node permits flipping of attachment points. If flipping the attachment point does not correct the intersecting link, the link may be truncated at the point where the link intersects the node.

If attachment point flipping is not permitted, link rerouting may occur. In link rerouting, the link is redrawn to follow the outlines of the fixed and moved nodes and where the outlines are connected by a retained portion of the original intersecting link.

Finally, an intersecting link may be corrected by a user selecting an attachment point of a node and manually moving it to a new non-intersecting location on the node.

The present invention has been implemented for use on a computer controlled display system having a graphical user interface and which utilizes an input device which allows a person to draw graphic objects for input. Examples of such systems include pen based systems, systems utilizing "paint" type programs, electronic whiteboards or electronic desk surfaces.

3

Figure 1:
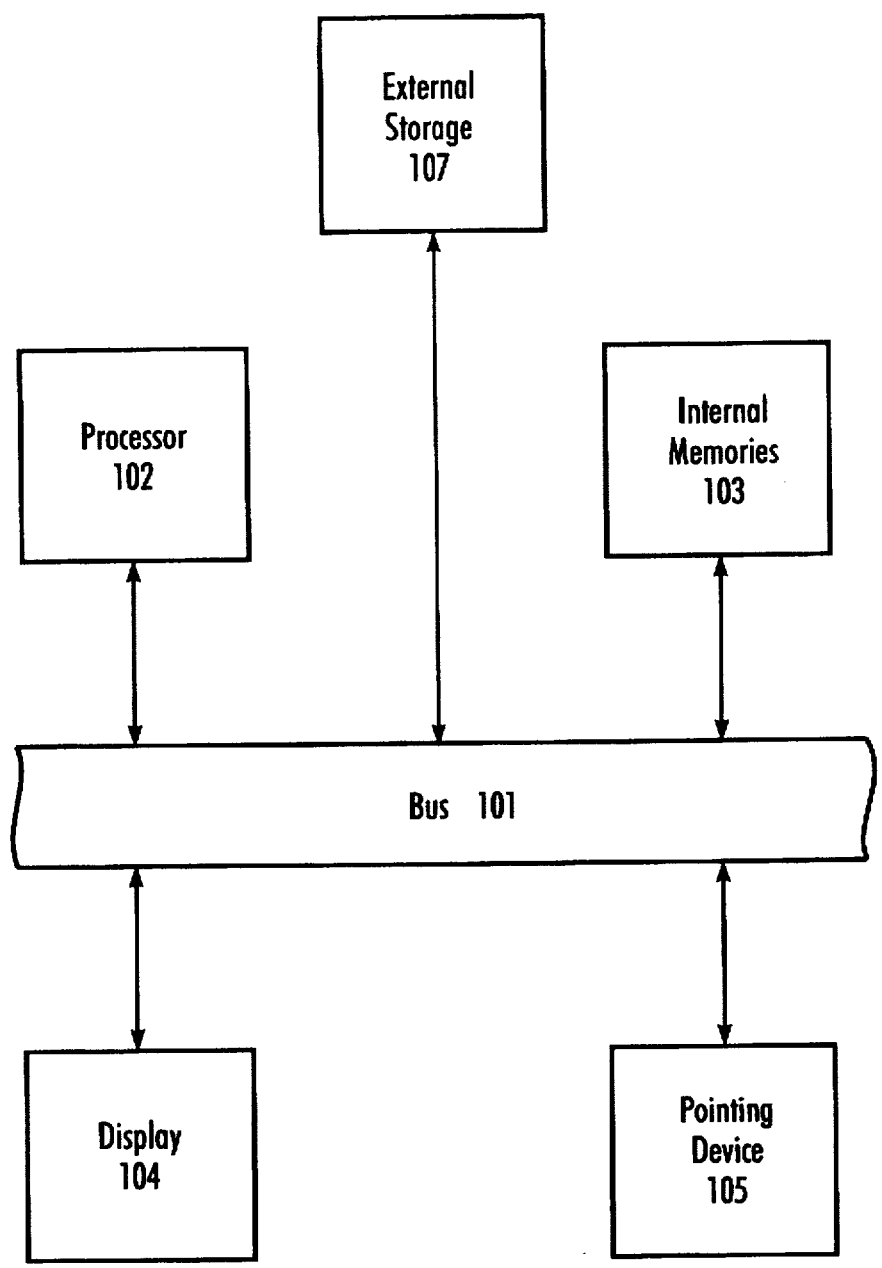
FIG. 1 is a block diagram of a computer based system as may be utilized in the currently preferred embodiment of the present invention.
Figure 2:
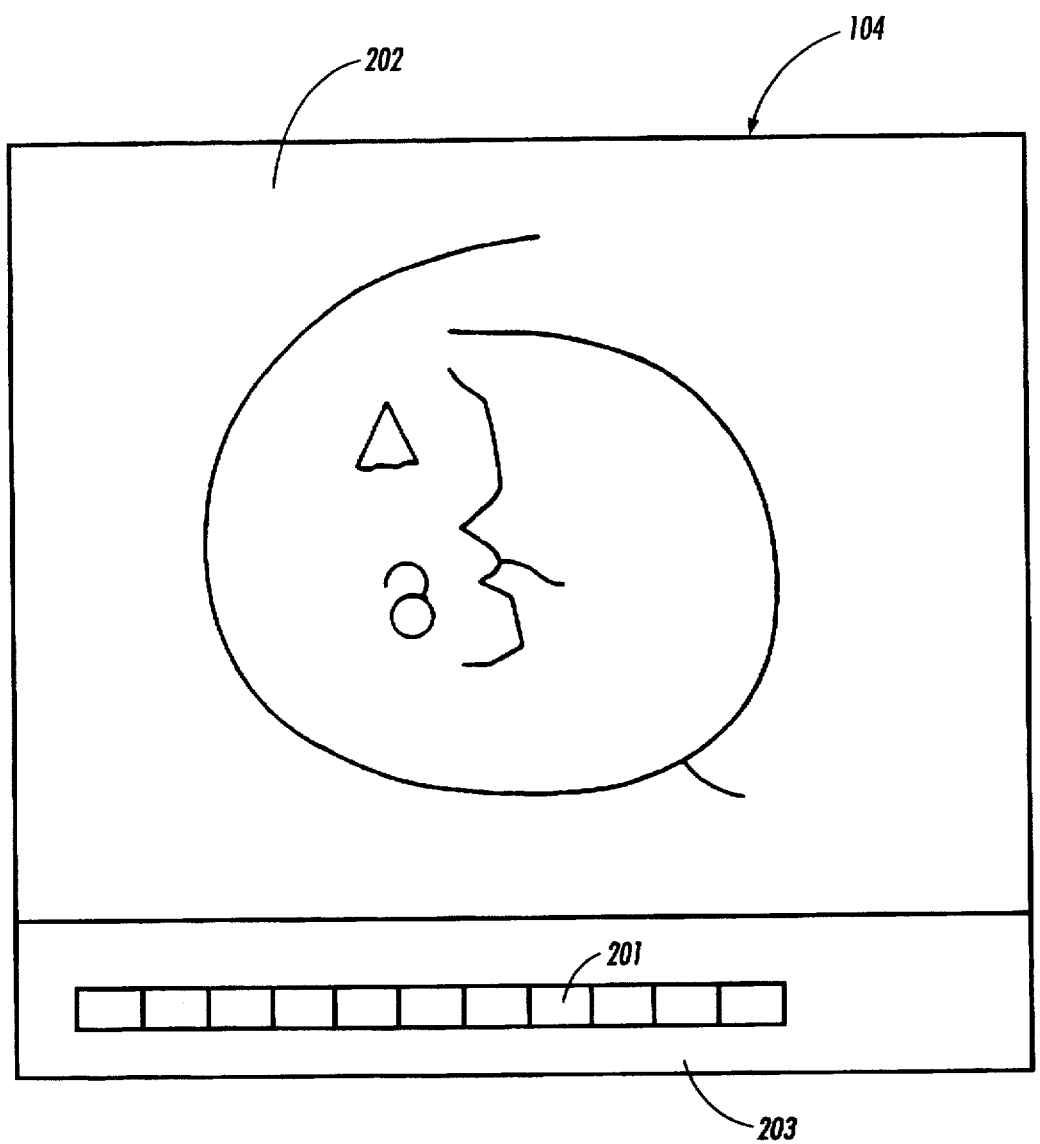

FIG. 2 is a representation of a basic graphical user interface and as may be displayed on the display and interfaced through the touch sensitive panel of FIG. 1.

Figure 3:
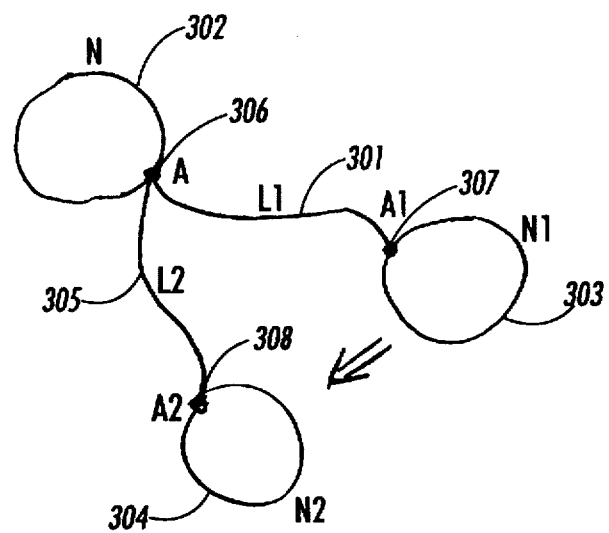

FIG. 3 is an illustration of a node being moved and corresponding link reshaped as may be performed in the currently preferred embodiment of the present invention.

Figure 4:
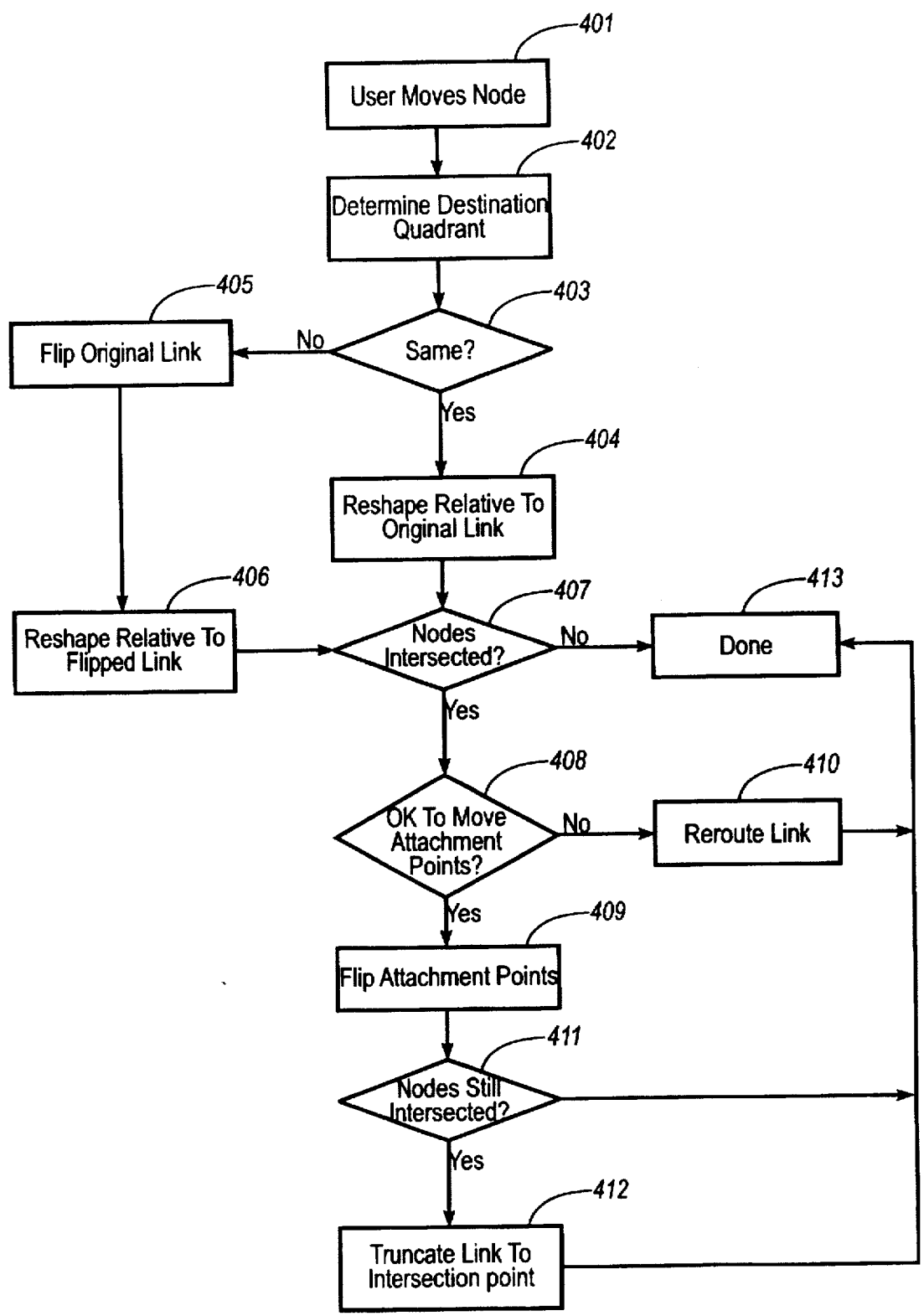

FIG. 4 is a flowchart summarizing the link reshaping as may be performed in the currently preferred embodiment of the present invention.

Figure 5:
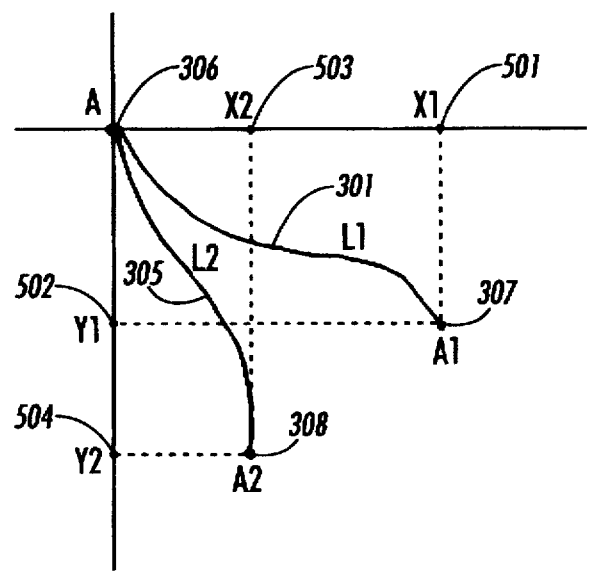
Figure 6:
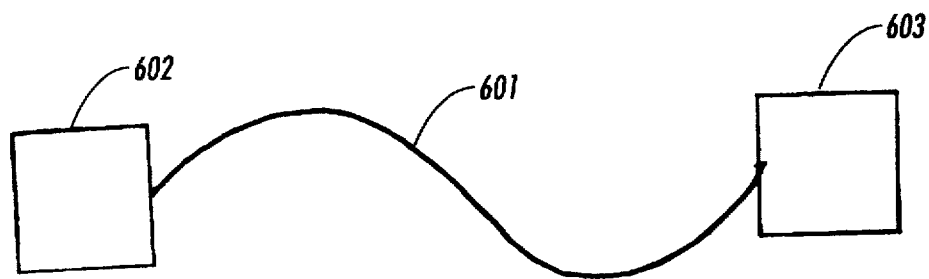
Figure 7:
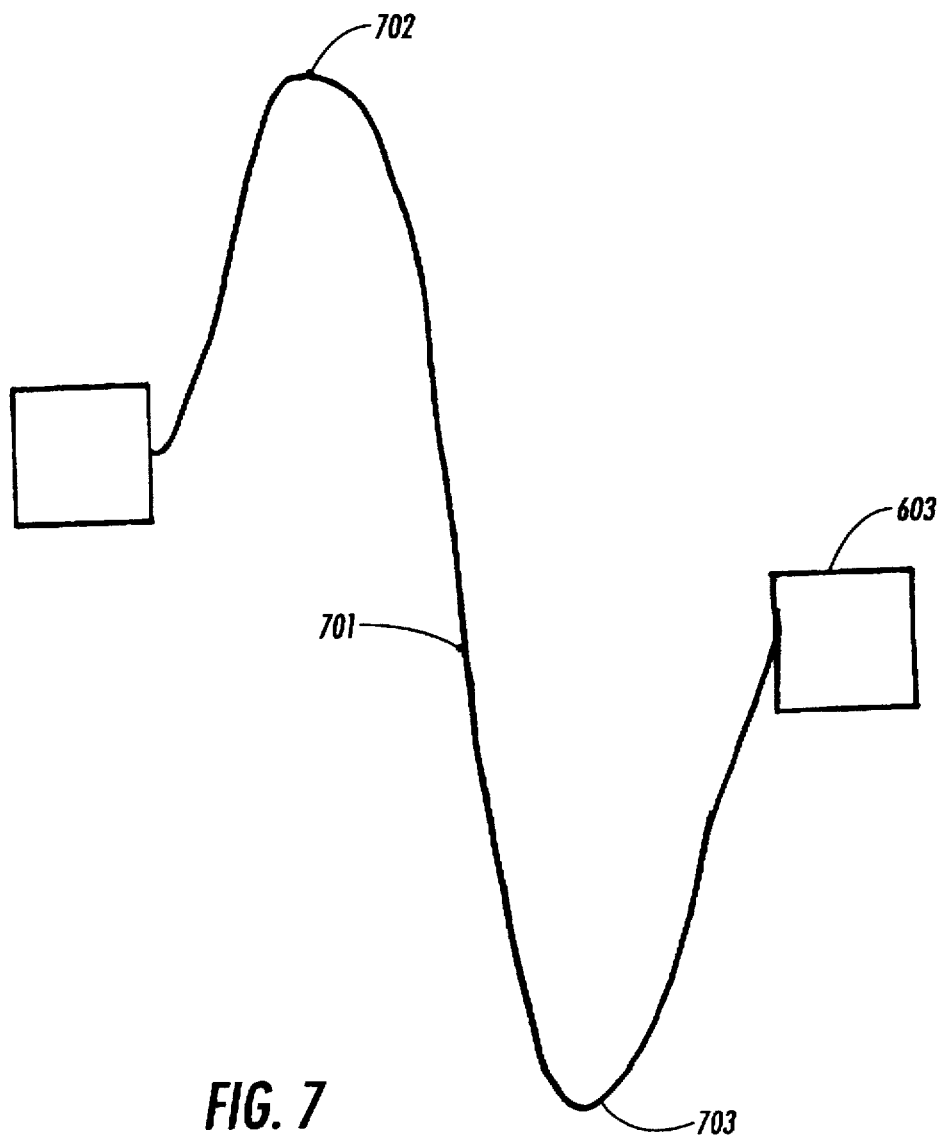

FIG. 5 illustrates the spatial coordinates of link reshaping as may be performed in the currently preferred embodiment of the present invention FIGS. 6 and 7 illustrate an undesirable result of simple geometric scaling of an instance of a link.

Figure 8:
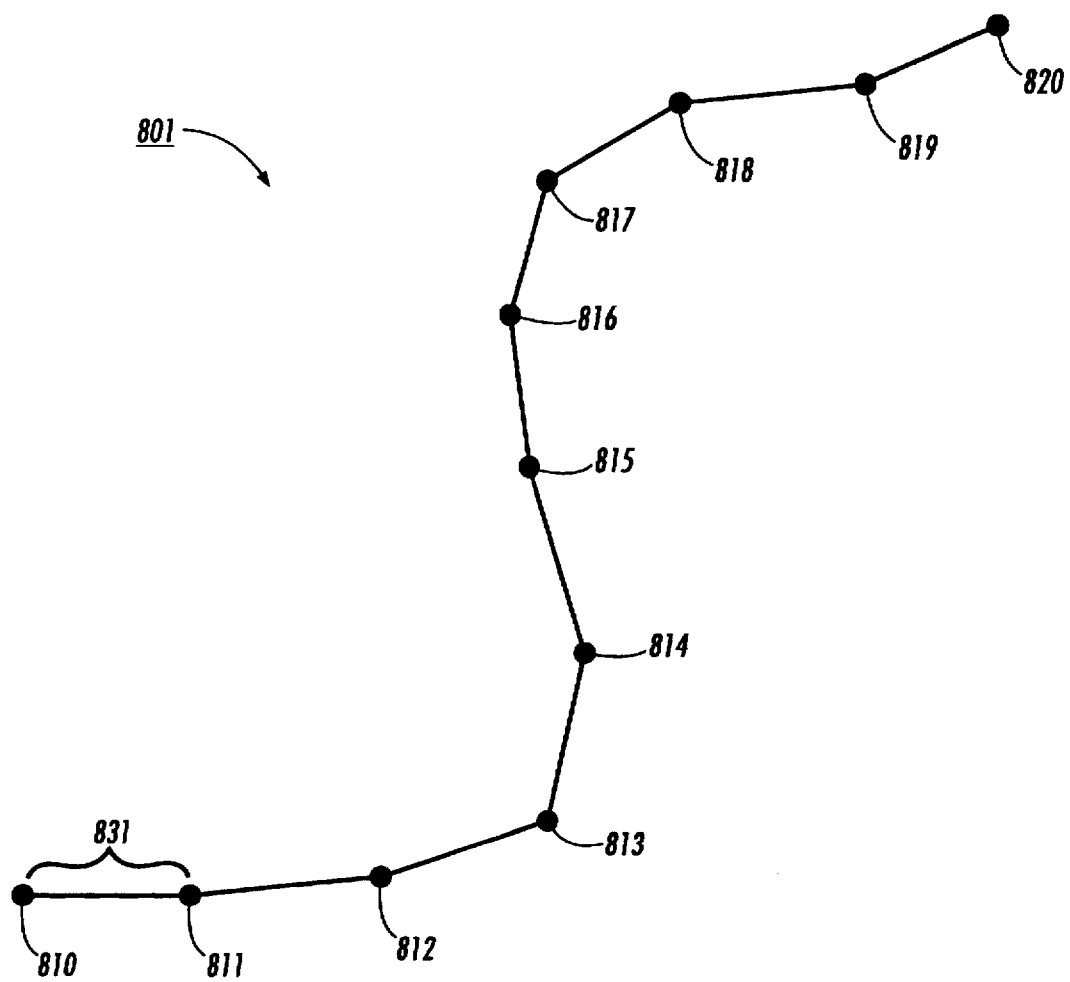

FIG. 8 is an illustration of curve sample points and segments as found in the representation of a curve in the currently preferred embodiment of the present invention.

Figure 9:
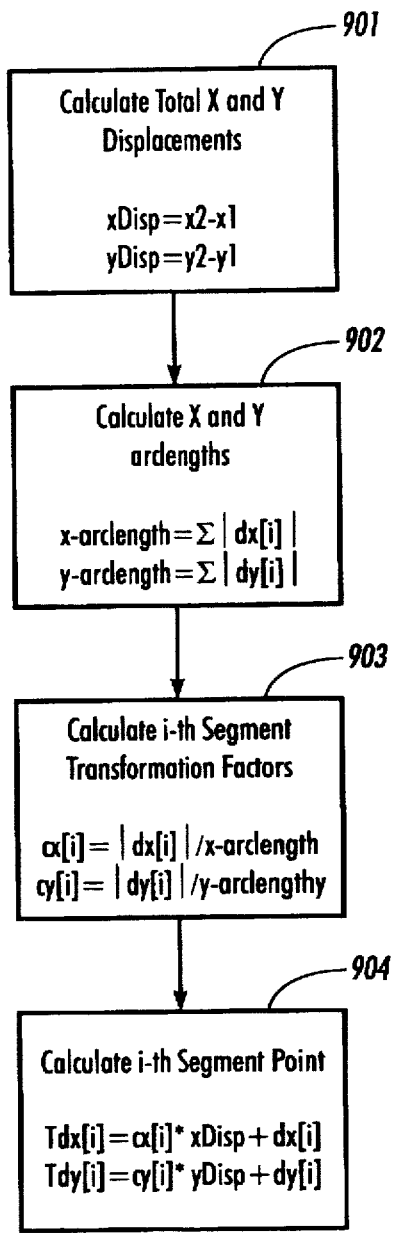

FIG. 9 is a flowchart illustrating the steps for curve transformation as may be performed in the currently preferred embodiment of the present invention.

Figure 10:
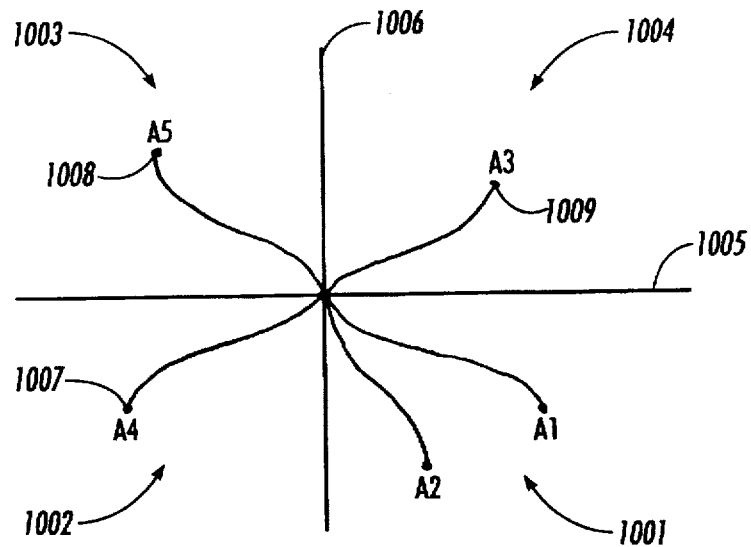

FIG. 10 is an illustration of the link of FIG. 3 as flipped across the various axes as may be performed when a node is moved out of its original quadrant as may be performed in the currently preferred embodiment of the present invention.

Figure 11:
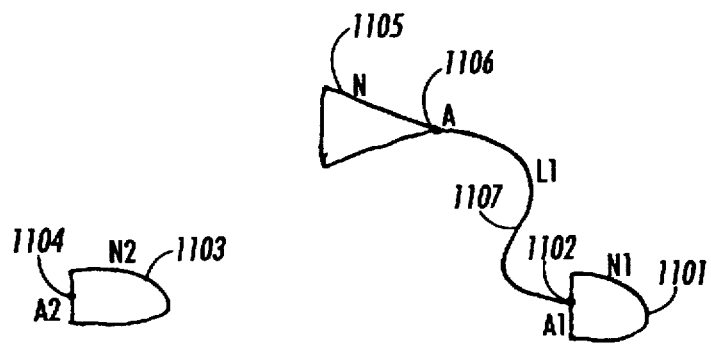
Figure 12:
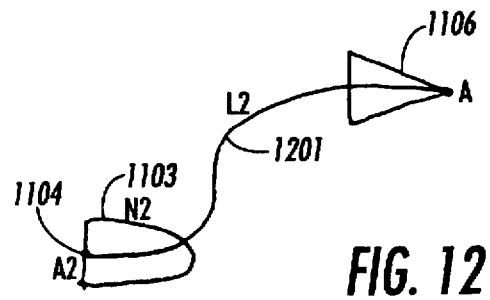

FIGS. 11–12 illustrate the moving of a node so that it causes the a reshaped link to intersect a node.

Figure 13:
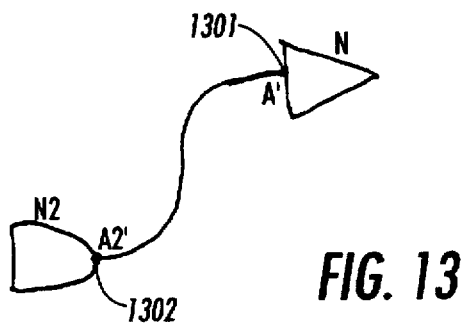

FIG. 13 is an illustration of flipping attachment points on a node after the movement of the nodes in FIG. 11 as may be performed in the currently preferred embodiment of the present invention.

Figure 14:
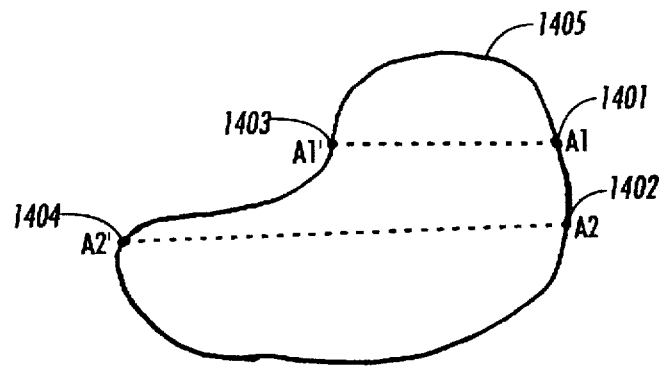

FIG. 14 is an illustration of selecting a flipped attachment point at various points on an asymmetrically shaped node as may be performed in the currently preferred embodiment of the present invention.

Figure 15:
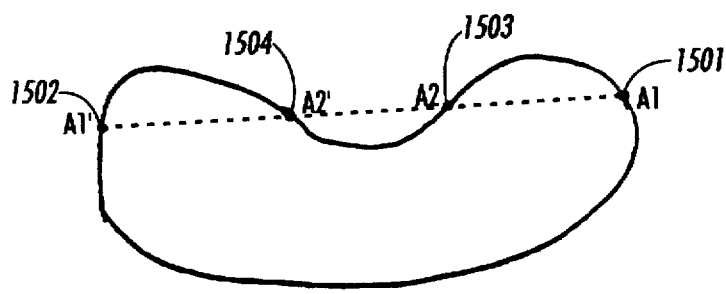

FIG. 15 is an illustration of selecting a flipped attachment point when the node is intersected at multiple points as may be performed in the currently preferred embodiment of the present invention.

Figure 16:
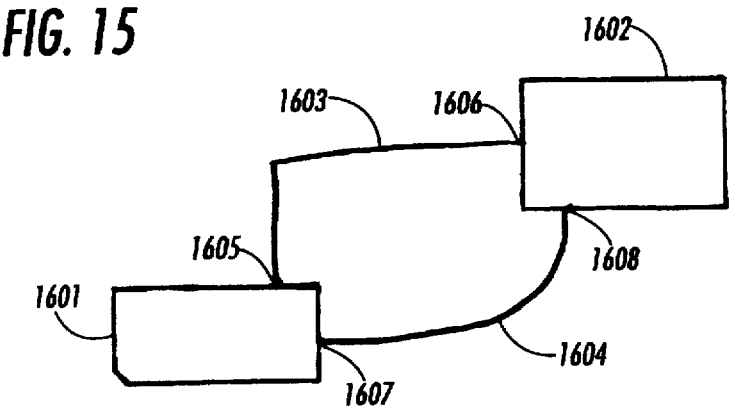
Figure 17:
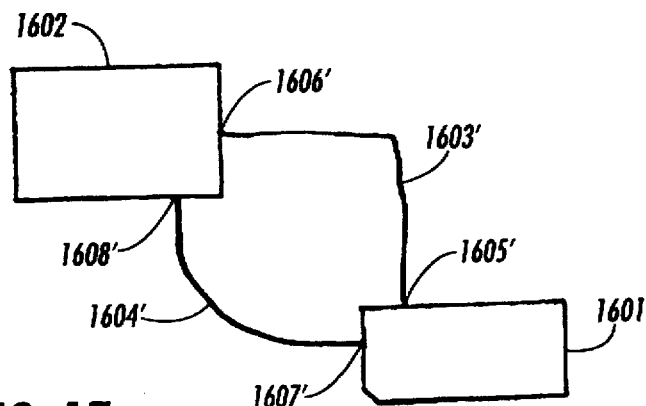

FIGS. 16 and 17 are an illustration of a variation of flipping an attachment point by moving an attachment point across the edge of a node as may be performed in the currently preferred embodiment of the present invention.

Figure 18:
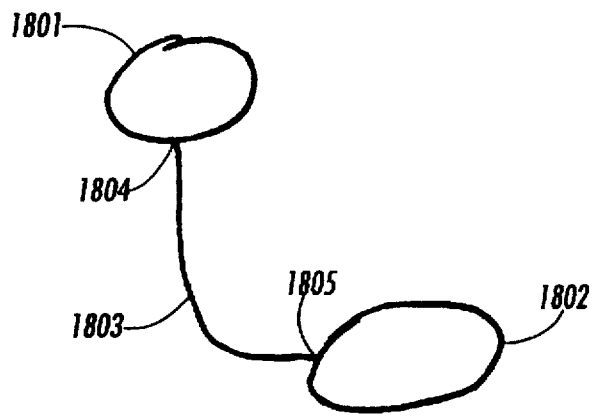
Figure 19:
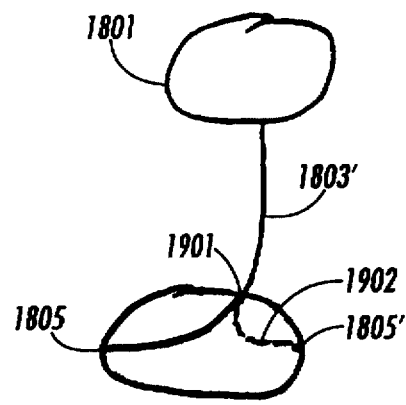

FIGS. 18 and 19 are an illustration of moving a node which causes a link to intersect the node and flipping the attachment point does not correct the node intersection.

Figure 20:
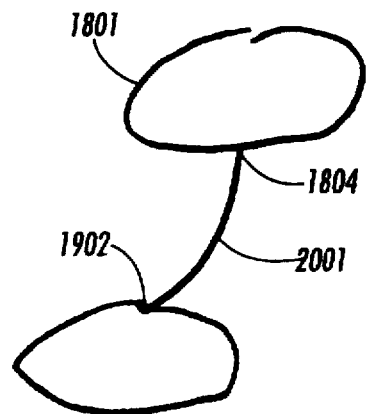

FIG. 20 is an illustration of link truncation as may be performed in the currently preferred embodiment of the present invention.

Figure 21:
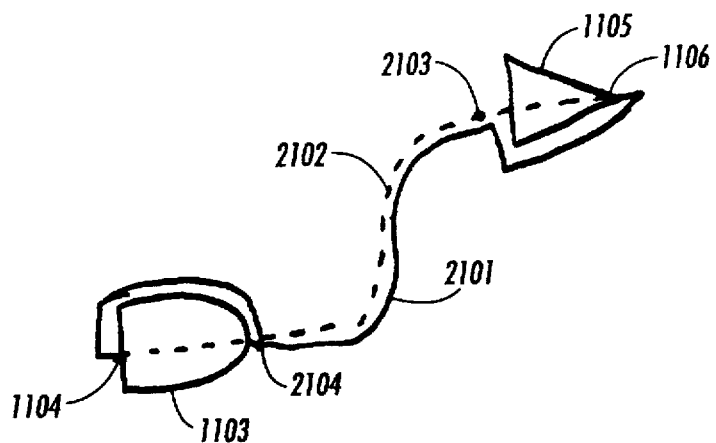

FIG. 21 is an illustration of link rerouting to correct intersecting nodes as may be performed in the currently preferred embodiment of the present invention.

Figure 22:
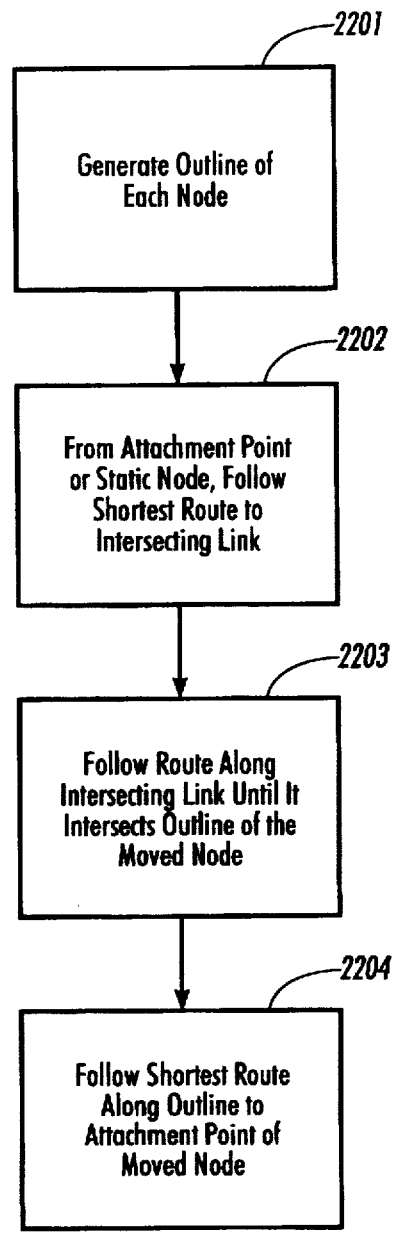

FIG. 22 is a flowchart illustrating the step for rerouting a link as may be performed in the currently preferred embodiment of the present invention.

FIGS. 23–26 illustrate the steps performed in FIG. 22 of rerouting a link.

Figure 27:
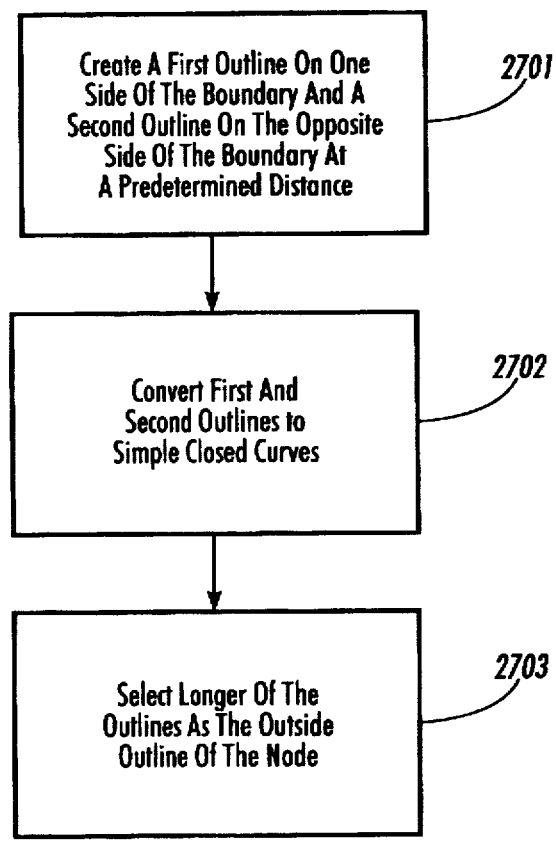

FIGS. 27 is a flowchart illustrating the steps for creating the outline of a node boundary as may be performed in the currently preferred embodiment of the present invention.

Figure 23:
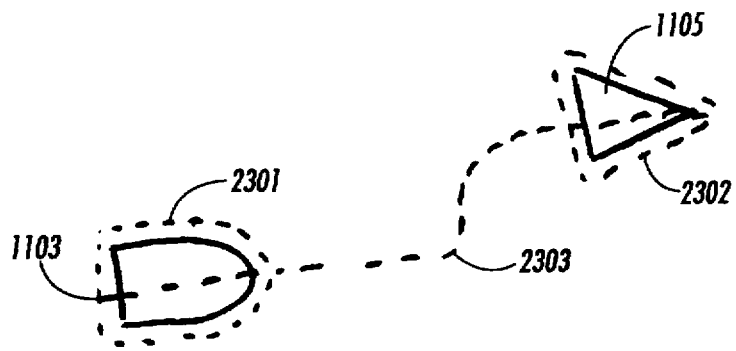
Figure 28:
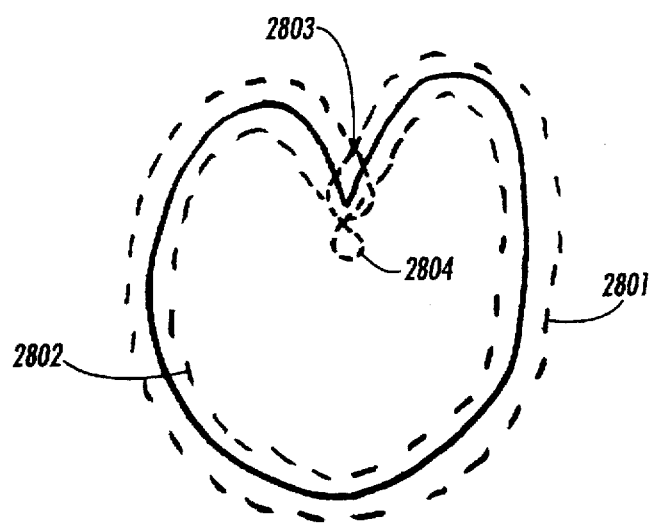
Figure 29:
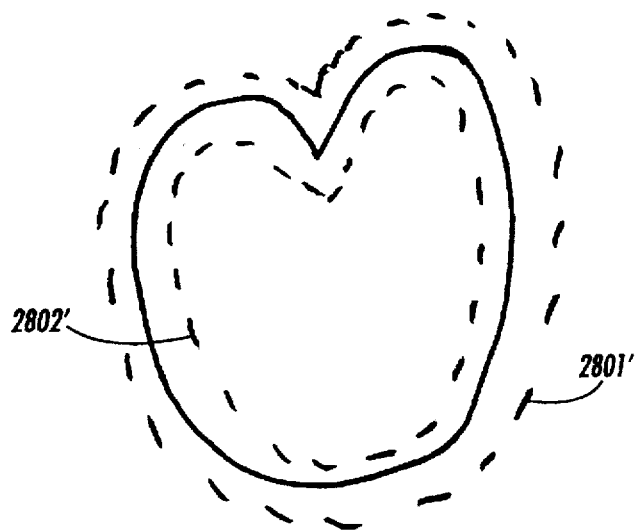
Figure 30:
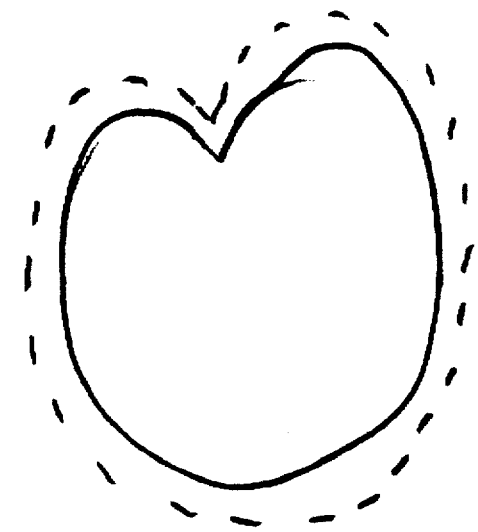

FIGS. 28–30 illustrate the performance of the various steps of FIG. 23 for creating the outline of a node boundary.

DETAILED DESCRIPTION OF THE PREFERRED EMBODIMENT

The present invention addresses a problem when working in a free-form graphics based computer system that is capable of manipulating node-link diagrams. A node-link diagram may include a flowchart, an organization chart, a state diagram, project management charts or the like. It is often desirable to be able to move nodes around in node-link diagram while retaining the links. Also, as the node-link diagram may be created in a free-form manner so that nodes and links have arbitrary shapes, it has been determined that it is desirable that the links retain their original shape characteristics. So the present invention enables a user to modify a node-link diagram through movement of nodes without having to be concerned about altering the links.

The following terms are used in this description and have their indicated meanings:

Graphic Object: Any displayed object in 2D space.

Curve: A one dimensional graphic object created manually by the user (e.g. a pen stroke) or made by other means, such as by a gesture (e.g. a selection rectangle resulting from a selection gesture).

Pen Stroke: An action with a pen which becomes an ink stroke or a gesture.

Ink stroke: A curve that is persistent.

Gesture: A curve made with a pen stroke that is ephemeral and which is interpreted as an action.

Selection: A set of graphic objects tagged as being selected.

Node: A graphic object or group of graphic objects within some bounded region. Such a bounded region will typically have a visible boundary.

Link: An ink stroke touching one or two nodes [i.e. linking them]. A node may also be linked to itself.

Overview of the Graphics Based Computer System of the Currently Preferred Embodiment The computer based system as may be utilized in the present invention is illustrated with reference to FIG. 1. Referring to FIG. 1, the computer based system is comprised of a plurality of components coupled via a bus 101. The bus 101 illustrated here is simplified in order not to obscure the present invention. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access or Read Only Memories). When in operation, program instructions for carrying out the various functional components of the present invention are stored in internal memory 103. The processor 102 and Internal memory 103 may be discrete components or a single integrated device. The processor 102 and internal memory 103 comprise circuitry for performing the various processing functions described herein. Also coupled to the bus 101 is external storage 107. The external storage 107 is typically a high capacity storage media such as magnetic or optical disk storage.

Also coupled to the bus 101 is a display 104 and a pointing device 105. In the currently preferred embodiment, the pointing device 105 is a pen driven touch sensitive panel which is integrated with the display 104 as a touch screen display. Such touch screen displays are well known in the art and are utilized in such systems as Pen based system and for electronic whiteboard systems. However, the pointing device 105 and display 104 need not be integrated so that the pointing device 105 may also be a stylus, mouse, track-ball or other cursor control device.

FIG. 2 illustrates a particular implementation of a graphical user interface as may be used in the present invention.

Referring to FIG. 2, the graphical user interface is displayed on display 104 and interacted with via touch panel 105. The graphical user interface employs a working surface and may employ a plurality of accessible functions 201 as is shown. The working surface 202 is where a user may draw various curves and where other graphic objects are displayed. The accessible functions 201 are positioned at the button area 203 of the display. The functions 201 may include operations for editing graphic objects (create, delete, move, shrink, etc.) or changing the operating mode of the touch panel 103 (e.g. switching from draw and gesture mode).

These functions may alternatively be accessed by a pull down menus that are commonly found in Windows oriented applications. These functions however are optional in designation, their principal objects being to define operations which are inherent in the operation of the system. These functions may perform the same functions that are invoked by gestures.

The currently preferred embodiment of the present invention is implemented on a pen based system having a Graphical User Interface (GUI). Such a GUI will typically support operations such as "tap" for selecting/deselecting a graphic object or "double tap" for invoking an operation that may be associated with the graphic object being tapped on. Once an object is selected it may be dragged and dropped to a desired location in the work space. As will be described in greater detail below, such a tap gesture will cause on outlining of the selected graphic object, e.g. a node in a node-link diagram, to be outlined and displayed in a visually distinct manner. This outlining provides the user with feedback that the graphic object has been selected.

The work space of the currently preferred embodiment permits graphic objects that are made "freehand". Hence nodes and links may have an arbitrary shape. This is consistent with how a whiteboard is used.

The currently preferred embodiment of the present invention has been implemented as software programs in the C++ programming language, for use on a pen based system, such as the LiveBoard, running under the control of a suitable whiteboard emulation program. Such software programs may be stored on a suitable storage medium such as magnetic diskettes or CD-ROMs.

Node-Link Diagrams

Node-link diagrams have many uses. They may be used to describe a process flow, or to show relationships between grouped items. The organization and relationship between nodes and links is referred to as the "topology" of the node-link diagram. It is desirable when manipulating the spatial position of nodes that the topology is retained.

A node in a node-link diagram has an arbitrary shape and represents a group of related graphic objects. These graphic objects may typically represent letters, words or other information conveying symbols. A node may be represented by the encircling of graphic objects with an ink stroke or by any grouping means. A node has a visible boundary which indicates the spatial limits of the node. A node may have multiple links to other nodes. Selection of a node will also cause selection of its links.

Links are ink strokes that are used to provide a visual connection between one or more nodes. Links may also have an arbitrary shape. Providing links between nodes is useful, particularly when re-positioning the nodes. Being able to retain the visual association between the nodes even as they are moved helps provide unencumbered usage of the graphics based system.

A link is created by simply drawing a curve that "touches" at least one node. By touching a node it is meant that the link endpoint is within a predetermined distance to the node boundary. The point at which a link "touches" a node is termed an "attachment point". Links are associated with at least one node (i.e. one-ended) and at most two nodes.

The currently preferred embodiment can handle multiple nodes and links, but the basic problem resulting from links are derived from the node-link diagram illustrated in FIG. 3. Referring to FIG. 3, a single link L1 301 with a node at each end, a stationary node N 302 and a node N1 303 that the user moves manually to a position labeled as N2 304. As a result of this move the link L1 301 is reshaped to be the link shown as L2 305. The attachment points of the link to the nodes are shown as A 306, A1 307, and A2 308.

Link Reshaping

FIG. 4 is a flowchart which overviews the link reshaping as may be performed in the currently preferred embodiment of the present invention. Referring to FIG. 4, first a user moves a node in a node-link diagram, step 401. This can be performed by a simple drag and drop operation or by any operation supported by the underlying graphical user interface. The first step in reshaping the node is to identify the destination quadrant, step 402. A determination is made if the destination quadrant is the same, step 403. Determination of the destination quadrant will indicate if flipping of the original link is required. If the destination quadrant is the same, curve transformation for the link occurs relative to the original link, step 404. If the destination quadrant is not the same, the original link is flipped across the respective axes to the destination quadrant, step 405. Curve transformation for the link is then performed relative to the flipped link, step 406.

After the link has been reshaped, it is determined if any of the nodes are intersected by the reshaped link, step 407. If no links intersect a node, then the link reshaping is completed, step 413. If links do intersect a node, it is determined if attachment points of the nodes may be moved, step 408. If they cannot, link rerouting may be performed, step 409. Otherwise, the attachments points to the nodes are rerouted, step 410. A check is then made to determine if an intersection still exists, step 411. If no nodes are intersected after the attachment points are flipped, the link reshaping is completed, step 413. If nodes remain intersected by links, the link is truncated at the point in which a node is intersected, step 412. Upon completion of truncation, the reshaping of the link is completed, step 413.

It should be noted that in the currently preferred embodiment attachment points may be selected and moved by the user. This is necessary since the user may want to alter the relationship between the nodes. Further, the user may want to do this if the user is not satisfied with the results of an automatic link reshaping.

Curve Transformation

As noted above, a link is an instance of a curve. Curve transformation can be conceptually thought of as the stretching or contraction of a link so that it retains its shape characteristics. For curve transformation, the link is considered in isolation, as shown in FIG. 5. Link L1 301 goes from A 306 to A1 307. It is desirable that the link L2 305, which goes from A 306 to A2 308, have the same shape characteristics as L1 301. It should be noted that in this representation the attachment point A 306 of the fixed node is placed at the origin of a two-dimensional coordinate system. So attachment point A1 307 is at coordinate (x1 501, y1 502) and attachment point A2 308 is at coordinates (x2 503, y2 504). The objective is to transform the remainder of the curve so that the shape characteristics of L1 301 are retained.

One way of performing a transformation is a simple geometric transformation (e.g. scaling). However, it has been determined that this causes undesirable results in certain situations. Such an instance is illustrated in FIGS. 6 and 7. Referring to FIG. 6, a link 601 in the shape of a single period of a sine curve is attached to node 602 and 603. A simple geometric transformation is typically given by the following: The x-y coordinates of the original attachment point are <x1,x2> and <x2,y2> for the attachment point as moved. To transform the link, every point P<x,y> on the link is moved to P'<x',y'>, where x'=* 2/x1 and y'=y * y2/y1. Note that in some cases the denominator may be small or even zero. The result is illustrated in FIG. 7. Referring to FIG. 7, as a result of moving node 603 the link 701 is transformed so that "humps" 702 and 703 of the curve are greatly extended. This is a result of the denominator being a small fractional number. Thus, the present invention utilizes a different approach for reshaping the link.

To better understand how curve transformation occurs, an understanding of how a curve is represented is necessary. The simplest way to represent a curve is by its set of sample points. These are naturally ordered by their order of input. Some system represent a curve directly by a bitmap, or a bitmap generated by fitting a curve(spline) through the sample points. In the currently preferred embodiment, a curve is represented by its starting point and its set of segments, where a segment is the vector <dx, dy> determined by two consecutive sample points. This is illustrated in FIG. 8. Referring to FIG. 8, a curve 801 appears on work surface. The curve 801 is detected by the samplings which occurred at points 810–820. The distance between sample points is termed a segment. For example, a segment 831 is defined between sample points 810 and 811 where sample point 811 is the end sample point. For convenience, the curve is normalized by orienting it so that the fixed attachment point is the starting point and the moved attachment point is the ending point of the curve.

The curve transformation technique of the currently preferred embodiments takes the difference between the before and after attachment points and distributes this onto the segments of the curve. In other words, the points making up the link are transformed to new locations so that the shape of the original link is maintained. The technique is described with reference to the flowchart of FIG. 9 and the coordinate points described in FIG. 3. Referring to FIG. 9, the first step is to calculate total X and Y displacements, step 901. Let (x1, y1) and (x2, y2) be the before and after positions of the moved attachment point of the link. Then:

$$xDisp = x2-x1,$$

$$yDisp = y2-y1.$$

The remaining steps are then carried out for each of the segments of the link. For the i-th segment <dx[i], dy[i]>, the transformation is calculated, as described in steps 902–904, resulting in a new i-th segment <Tdx[i], Tdy[i]>. This is performed by the following calculation:

First the x and y arclengths of the curve is computed, step 902:

$$x\text{-arclength} = \Sigma |dx[i]|,$$

$$y\text{-arclength} = \Sigma |dy[i]|,$$

where |x| denotes the length or absolute value of x.

Then the transformation factors $cx[i]$ and $cy[i]$ are calculated based on the x and y lengths of the i-th segment, step 903:

$$cx[i] = |dx[i]|/(x\text{-arclength}),$$

$$cy[i] = |dy[i]|/(y\text{-arclength}).$$

Now the contributions of the displacement to be added to the i-th segment are given by $cx[i]* xDisp$ and $cy[i]* yDisp$, so the new i-th segment, is computed by, step 904:

$$Tdx[i] = cx[i]*xDisp+dx[i],$$

$$Tdy[i] = cy[i]*yDisp+dy[i].$$

Flipping the link shape

Note in the examples in FIGS. 3 and 5 that attachment points A1 and A2 are in the same quadrant of the coordinate system defined where attachment point A is the origin. In the currently preferred embodiment, besides being reshaped, if A2 is in a different quadrant than A1, then the link shape will be flipped (mirror-reversed) around the x-axis, the y-axis, or both. This flipping is a desirable visual property, since this is what the user naturally expects. FIG. 10 shows these three cases of flipping. If A1 were moved from quadrant 1001 to quadrant 1002, the result would be A4 1007. The flipping would occur about the y-axis 1006. If Al were moved from quadrant 1001 to quadrant 1003, the result would be A5 1008. The flipping would occur about the y-axis 1006 and the x-axis 1005. Finally, if Al were moved to quadrant 1004, the result would be A3 1009. The flipping would occur about the x-axis 1005.

Generally, when movement out of the quadrant occurs, what first occurs is the flipping of the link to the destination quadrant. Flipping the link shape is accomplished by a simple geometric transformation to the desired quadrant. This is followed by the link reshaping described above performed relative to the flipped link.

Having transformed the shape of the link, this is all that needs to be done in the simple case shown in FIG. 3. But FIGS. 11 and 12 illustrate a case where the reshaping and flipping have created undesirable results. Referring to FIG. 11, node N1 101 with attachment point A1 1102 is moved to a position denoted as N2 1103 with attachment point A2 1104. Fixed node N 1105 has attachment point A 1106. Link L1 1107 links node N 1105 with node N1 1101. The result of this after link reshaping and flipping is shown in FIG. 12. The link L1 1107 has been reshaped to link L2 1201, and L2 1201 intersects both node N 1101 and node N2 1103. This is surely not what the user wants. Thus, techniques for adjusting the attachment points to obtain satisfactory results are needed.

Flipping attachment points

A first step in correcting node intersection is to just flip the attachment points of the link. There are two cases of flipping; across a nodes or along an edge. In flipping an attachment across a node, the flipping occurs to the opposite sides of the nodes. The results of applying this technique to the example in FIGS. 11–12 is shown in FIG. 13, where attachment points A and A2 in FIG. 13 are moved to A'1301 and A2'1302. With respect to maintaining the topography and visual results, this provides quite satisfactory results. However, it is recognized that in some instances the node shape has a meaning such that a relationship between nodes will be interpreted differently depending on where a link is attached. For example, attachment on one side indicates an input and attachment on the opposite side indicates an output. Thus, internal node representations will contain some indicator, such as a flag or a node type, which may be used to indicate whether or not the flipping of attachment points is permitted.

Flipping attachment points is straightforward in the case where the node shape is nearly symmetric about the axis of flip. So consider the asymmetric case. Only the case of left-right flipping about the vertical axis is considered; the other cases are similar. The asymmetric case is illustrated in FIG. 14. Referring to FIG. 14, an asymmetrically shaped node 1405 is shown. To flip a point A1 1401 from left to right a horizontal line is drawn from A1 1401 to the other side of the node 1405 until it intersects the node at A1'1403, which is the new attachment point. Note that in an asymmetric case the flipped points can be quite different. For example, both A1 1401 and A2 1402 are on the far right of the node, and the flipped point A2'1404 is on the far left of the node 1405, but flipped point A1'1403 is in the middle of the node 1405.

Another case to consider is where the horizontal line intersects the node enclosure in more than two places. It is then important to pick the corresponding point to flip to. This case is illustrated in FIG. 15. Referring to FIG. 15, points A1 1501 and A1'1502 correspond as flip points and points A2 1503 and A2'1504 correspond as flip points. To identify the corresponding flip point, number the intersection points going from left to right. Determine the number I of the current attachment point (i.e. the attachment point is the Ith from the left). Now number the points going from right to left. The corresponding point is the Ith point from the right.

Flipping an attachment point along the edge of a node occurs when movement of the node is parallel to the node edge having the attachment. Further, the beginning and ending location of the nodes must be such that there is no overlap. Flipping an attachment point across the edge of a node is illustrated in FIGS. 16 and 17. Flipping an attachment point across an edge may occur on one node while flipping across the node may occur across the other node. Referring to FIG. 16, nodes 1601 and 1602 are linked via links 1603 and 1604. Link 1603 is attached to node 1601 at attachment points 1605 and to node 1602 at attachment point 1606. Link 1602 is attached to node 1601 at attachment point 1607 and to node 1602 at attachment point 1608. Referring now to FIG. 17, the node 1601 has been moved to a new position wherein the attachment points 1606 and 1607 are flipped across nodes 1602 and 1601, respectively to attachment points 1606' and 1607' Meanwhile the attachment points 1605 and 1608 have been flipped across the edge of their respective nodes 1601 and 1602 to attachment points 1605' and 1608'. Note that the links 1603 and 1604 have been reshaped to links 1603' and 1604' and retain their basic shape characteristics.

The flipping of an attachment point along an edge is accomplished by finding a center point of the edge, finding a distance X between the center point and the attachment point, and flipping the attachment point to a location a distance X on the opposite side of the center point.

Truncating Links

Even when these techniques are applied, the link can still intersect a node. This is illustrated in FIGS. 18–19. Referring to FIG. 18, node 1801 is connected to node 1802 via link 1803. Link 1803 is attached to node 1801 at attachment point 1804 and to node 1802 at attachment point 1805. FIG. 19 illustrates the results of moving node 1802. Referring to FIG. 19, the link 1803 has been reshaped and is illustrated as link 1803'. It is noted that the link 1803' intersects the node 1802 at point 1901. Point 1805' indicates where attachment point 1805 would be flipped. However, it is clear that even the flipping of the node would not correct the intersecting link (as illustrated by the dotted line 1902 which indicates the effect of attachment points flipping). Thus, a further "unintersection" technique is required.

To truncate a link from a node, simply find where the link intersects the node and then make that the attachment point. When a link is truncated, the overall shape of the link changes because the truncated portions are discarded. In the currently preferred embodiment, the link 1803' is truncated at intersection point 1901, deleting the segment of the link from intersection point 1901 to attachment point 1805. The result is shown in FIG. 20 wherein the reshaped link is illustrated as link 2001.

Note that in cases where there are multiple intersection points of a link on a node, the intersection point that is closest to the attachment point of the fixed node is chosen. Further, note that an alternative to truncating the link would be to curve transform the link at the point the link intersected the node.

Link Rerouting

Link rerouting is performed when an attachment point is not to be moved (flipped) and a node intersection occurs. An example of link rerouting is illustrated in FIG. 21. FIG. 21 illustrates a link rerouting that may be used to correct the node intersecting link of FIG. 12. Referring to FIG. 21, rerouted link 2101 has been rerouted to avoid the intersection with the node. Dashed line 2102 indicates where the link was originally after reshaping. The rerouted link 2101 follows the shape of the node 1105 from the attachment point 1106 to a point 2103 where it meets up with intersecting link 2102. Then the rerouting follows the shape of the link 2102 up to where it would intersect node 1104 (i.e. point 2104). From there the route follows the shape of node 1103 to the attachment point 1104.

FIG. 22 is a flowchart illustrating the steps of a simple technique for rerouting a link. It is assumed that an intersecting link has been generated. First, an outline of each of the nodes is generated, step 2201. A description of how node outlines are generated is provided below with respect to FIGS. 27–30. In any event, this is illustrated in FIG. 23 where outlines 2301 and 2302 of nodes 1103 and 1105 respectively, are illustrated. Also shown in FIG. 23 is intersecting link 2303.

Figure 24:
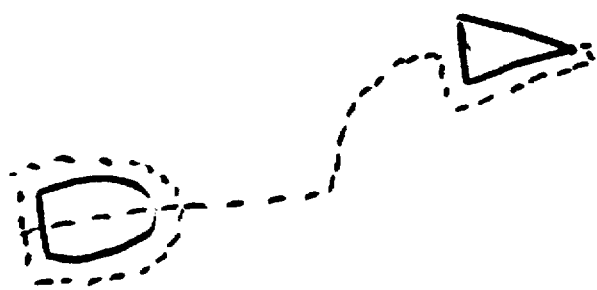

Next, starting from the attachment point of the fixed node, a route following the outline and having the shortest distance to the intersecting link is chosen, step 2202. This is illustrated in FIG. 24. Note that the portions of outline 2302 and intersecting link 2303 that have not been used have been discarded.

Figure 25:
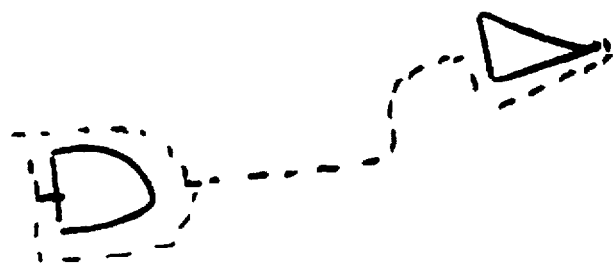

The route then follows the intersecting link until it reaches the point where the outline of the moved node is intersected and the remainder of the intersecting link discarded, step 2203. This is illustrated in FIG. 25 where the portion of the link 2303 intersecting node 1103 are discarded.

Figure 26:
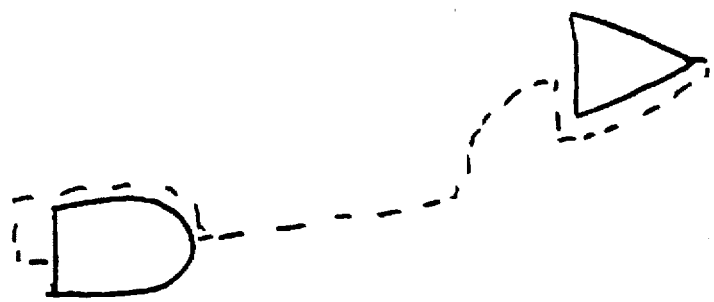

At this point the route follows the shape of the moved node in the direction so that the attachment point of the moved node is reached in the shortest distance, step 2204. This is illustrated in FIG. 26 wherein the portions of the outline 2301 that are not used are discarded.

Node Outlining

Finding the outline of the boundary of an arbitrarily shaped node is a non-trivial task. For an arbitrarily shaped closed curve representing the boundary, there is difficulty in determining whether a point lies on the inside or outside of the curve. The technique for finding an outline is described by the flowchart of FIG. 27. Referring to FIG. 27, a first outline is drawn from a starting point on one side of a boundary and a second outline is drawn from the starting point on the opposite side of the boundary, step 2701. It is necessary to draw outlines on both sides of the boundary since it is not readily known where the curve started from and so it is unclear which is the "inside" or "outside" outline. In any event, each of the outlines is drawn the same predetermined distance from the boundary. This is illustrated in FIG. 28 where an outside outline 2801 and an inside outline 2802 are shown. It should be noted that what effectively occurs is the drawing of outlines on the inside and outside of the node boundary.

Next, each of the outlines are converted into simple closed curves, step 2702. This is accomplished for each of the outlines by trimming small pieces at the end of the resulting curves. Such smaller curves are illustrated in FIG. 28 by the curve 2803 of outline 2801 and curve 2804 of outline 2802. These curves arise by the outlining process. The discarding of these smaller curves is illustrated in FIG. 29 as outlines 2801' and 2802'.

Finally, the longer of the outlines is selected as the outline for the node, step 2703. Determining the longer of the outlines is accomplished by simply summing the distances of the various segments of the two outlines and then comparing the sums. The longer of the outlines will clearly be the "outside" outline for the node. This is illustrated in FIG. 30.

It should be noted that the outlining process described above is used for more than link rerouting. In the currently preferred embodiment, the same outlining process is used to indicate selection of a node. This is done by highlighting or coloring the outline curve to give visual feedback to the user that the node enclosed by the outline is selected.

Thus, a method and apparatus for maintaining links when moving nodes in a node link diagram in a graphics based computer system has been disclosed. While the present invention is described with respect to a preferred embodiment, it would be apparent to one skilled in the art to practice the present invention in alternative embodiments supporting gesture based input. Such alternate embodiments would not cause departure from the spirit and scope of the present invention.

We claim:

1. A method for curve transformation of an arbitrarily shaped link responsive to moving a node in a node-link diagram, said node-link diagram having a first node linked to a second node via a link, said link attached to said first node at a first attachment point and to said second node at a second attachment point, said method comprising the steps of:
   a) storing link shape information, said link shape information including link segment information;
   b) detecting that said second node has been moved;
   c) identifying a third attachment point for said second node at the destination of said moved second node, said third attachment point at the same location on said second node as said second attachment point;
   d) generating link displacement data for said link based on said stored link shape information;
   e) transforming each segment of said link whereby said link is curve transformed, said transforming of each segment accomplished by performing the substeps of:
      e1) determining an arclength for said segment;
      e2) determining transformation factors based on the length of said segment and said arclength for said segment;
      e3) determining a transformed segment location and length based on said transformation factors, link displacement data and the original segment endpoint location; and
      e4) displaying said transformed segment between said transformed segment endpoint location and a previous transformed segment endpoint.

2. The method as recited in claim 1 wherein said step of generating link displacement data for said link is further comprised of the steps of:
   b1) defining an X-Y coordinate system having said first attachment point as an origin;
   b2) determining displacement values in X and Y dimensions based on said second and third attachment points.

3. The method as recited in claim 2 wherein said substep of determining transformation factors based on the length of said segment and said arclength for said segment is further comprised of the substeps of:
   determining the length of said segment in the X dimension;
   determining the X-arclength of said segment as the length of said link up to said segment in the X dimension;
   calculating an X dimension transformation factor based on the ratio between said length of said segment in the X dimension and said arclength of said segment in said X dimension;
   determining the length of said segment in the Y dimension;
   determining the Y-arclength of said segment as the length of said link up to said segment in the Y dimension; and
   calculating a Y dimension transformation factor based on the ratio between said length of said segment in the Y dimension and said arclength of said segment in said Y dimension.

4. The method as recited in claim 3 wherein said substep of determining a transformed segment location and length based on said transformation factors, link displacement data and the original segment location is further comprised of the substeps of:
   calculating the product of said X dimension transformation factor and said X dimension displacement value and adding to X-dimension coordinate of said original segment endpoint location; and
   calculating the product of said Y dimension transformation factor and said Y dimension displacement value and adding to Y-dimension coordinate of said original segment endpoint location.

5. A method for maintaining the topology of a node-link diagram when a node is moved, said node-link diagram having a first node linked to a second node via a link, said link attached to said first node at a first attachment point and to said second node at a second attachment point, said method comprising the steps of:
   a) detecting that a user has moved said second node in said node-link diagram;
   b) defining said first attachment point as an origin point for a coordinate system for reshaping said link;
   c) determining a third attachment point based on said moved second node;

d) determining the quadrants for said second attachment point and said third attachment point;

e) if the quadrant for said second attachment point and said third attachment point are the same, curve transforming said link responsive to moving said second node based on the shape characteristics of the original link;

f) if the quadrant for said second attachment point and said third attachment point are different, reshaping said link by performing the substeps of:

f1) flipping said link to said quadrant of said third attachment point; and f2) curve transforming said link based on the shape characteristics of said flipped link.

6. The method as recited in claim 5 further comprising the steps of:

g) detecting that a curve transformed link intersects either said first node or said second node;

h) determining that said first node and said second node may flip attachment points;

i) determining corresponding flip attachment points for said first attachment point and said third attachment point; and j) modifying said link to attach to said flip attachment point for said first attachment point and said flip attachment point for said third attachment point.

7. The method as recited in claim 6 wherein at least one of said flip attachment point for said first attachment point or said flip attachment point for said third attachment point is across the corresponding node.

8. The method as recited in claim 6 wherein at least one of said flip attachment point for said first attachment or said flip attachment point for said third attachment point is along an edge of the corresponding node.

9. The method as recited in claim 6 further comprising the steps of:

g) detecting that a curve transformed link intersects either said first node or said second node;

h) identifying an intersection point; and i) modifying said curve transformed link to attach to said moved second node at said intersection point by truncating said curve transformed link.

10. The method as recited in claim 5 further comprising the steps of:

g) detecting that a curve transformed link intersects either said first node or said second node;

h) determining that said first node and said second node may not flip attachment points; and i) rerouting said curve transformed link so that neither said first node or said second node is intersected.

11. The method as recited in claim 10 wherein said step of rerouting said curve transformed link is further comprised of the steps of:

i1) drawing an outline of said first node and said second node;

i2) determining a first route part from said first attachment point to said curve transformed link based on said outline of said first node;

i3) determining a second route part from said third attachment point to said curve transformed link based on an intersection point of said curve transformed link and said outline of said second node; and i4) providing said rerouted link as said first route part, said second route part and a portion of said curve transformed link connecting said first route part and said second route part.

12. The method as recited in claim 5 wherein said step of curve transforming said link is further comprised of the steps of:

generating link displacement data for said link based on said second attachment point and said third attachment point;

transforming each segment of said link whereby said link is curve transformed, said curve transforming accomplished by performing the substeps of:

determining an arclength for said segment;

determining transformation factors based on the length of said segment and said arclength for said segment;

determining a transformed segment endpoint location based on said transformation factors, link displacement data and the original segment endpoint location; and displaying said transformed segment between said transformed segment endpoint and a previous transformed segment endpoint location.

13. A computer controlled display system for controlling a work surface, said computer controlled display system comprising:

an input device for creating and moving free form graphic objects on said work surface;

a display for displaying the contents of said work surface;

processing circuitry for interpreting graphic objects on said work surface as a node-link diagram, said processing circuitry further comprising:

circuitry for detecting that a node in said node-link diagram has been moved and identifying a destination location for said moved node;

circuitry for curve transforming a link attached to said moved node so that it remains attached to any associated nodes and retains the original shape characteristics; and circuitry for detecting that a link intersects a node and modifying said link to eliminate said intersection.

14. The computer controlled display system as recited in claim 13 wherein said circuitry for curve transforming a link attached to said moved node so that it remains attached and reshapes while retaining its original shape characteristics is further comprised of:

circuitry for generating link characteristic data;

circuitry for flipping a link about an axis;

circuitry for curve transforming each segment of said link based on said link characteristic data, an original location of said moved node and said destination location of said moved node.

15. The computer controlled display system as recited in claim 13 wherein said circuitry for detecting that a link intersects a node and modifying said link to eliminate said intersection is further comprised of:

circuitry for detecting an intersection point; and circuitry for modifying said link so that it attaches to said node at said intersection point.

16. A program storage device readable by a machine, tangibly embodying a program of instructions executable by the machine to perform method steps for curve transforming a link responsive to moving a node in a node-link diagram, said node-link diagram having a first node linked to a second node via a link, said link attached to said first node at a first attachment point and to said second node at a second attachment point, said method comprising the steps of:

a) storing link shape information, said link shape information including link segment information;

b) detecting that said second node has been moved;

c) identifying a third attachment point for said second node at the destination of said moved second node, said third attachment point at the same location on said second node as said second attachment point;

d) generating link displacement data for said link based on said stored link shape information;

e) transforming each segment of said link whereby said link is curve transformed, said transforming of each segment accomplished by performing the substeps of:

e1) determining an arclength for said segment;

e2) determining transformation factors based on the length of said segment and said arclength for said segment;

e3) determining a transformed segment location and length based on said transformation factors, link displacement data and the original segment endpoint location; and e4) displaying said transformed segment between said transformed segment endpoint location and a previous transformed segment endpoint.

\* \* \* \* \*